US006393255B1

(12) United States Patent
Lane

(10) Patent No.: US 6,393,255 B1
(45) Date of Patent: May 21, 2002

(54) SATELLITE ANTENNA POINTING SYSTEM

(75) Inventor: Steven O. Lane, Rolling Hills Estates, CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/371,631

(22) Filed: Aug. 11, 1999

(51) Int. Cl.[7] .......................................... H04B 7/185
(52) U.S. Cl. ...................... 455/13.3; 342/354; 342/359
(58) Field of Search .............................. 455/13.3, 12.1, 455/427, 429, 430, 25; 342/354, 359, 356, 372, 373; 244/163

(56) References Cited

U.S. PATENT DOCUMENTS 4,630,058 A * 12/1986 Brown ...................... 342/359
5,587,714 A * 12/1996 Chu et al. .................. 342/354

* cited by examiner

*Primary Examiner*—Lee Nguyen
(74) *Attorney, Agent, or Firm*—Terje Gudmestad

(57) ABSTRACT

A satellite antenna pointing system has a reflector antenna for receiving an uplink signal from an earth based ground station and a satellite based phased array assembly for transmitting a downlink signal. Because extraterrestrial communications suffer significant losses during transmission, accurate pointing of both uplink and downlink antennas is desired in order to reduce required signal strength. The present invention uses two different methods for pointing the uplink and downlink antennas.

19 Claims, 2 Drawing Sheets

SATELLITE ANTENNA POINTING SYSTEM

TECHNICAL FIELD

The present invention relates to satellite communications, and more particularly, to satellite antenna pointing systems.

BACKGROUND ART

One of the primary uses of satellites is for communications. Commonly, a satellite will receive signals from transmitting stations located on the Earth, frequency translate and amplify these signals, then retransmit the signals to receiving stations located on the Earth. Satellites usually employ multiple antennas for the reception and transmission of signals for a variety of reasons. These reasons include: separating the transmitting and receiving functions and then providing multiple beams that communicate with different portions of the Earth, providing reuse of scarce frequency bands by using separate antennas that point in different directions while using the same frequency, and many others.

High-performance communications satellites use antennas that respond to signals from one direction much greater than from other directions. Hence, when using multiple antennas, each antenna must be pointed with meticulous accuracy to receive relatively weak communications signals from Earth based transmission stations or to transmit signals back to Earth based on receiving stations without overly degrading communications performance.

Conventionally, satellite antenna pointing systems use antennas that consist of an array of feeds that illuminate one or more reflectors to form beams. These antennas are positioned so that they can provide beams pointing towards a ground station on the earth's surface.

A sensor is used to control the beams pointing directions. The sensor consists of the array of feeds, a tracking network that forms special beams called tracking beams and a tracking receiver. The sensor receives beacon signals transmitted from a station on the earth at a known pointing direction. The tracking receiver operates on the tracking beams to generate error signals that are proportional to the pointing error of the antenna. The error signals are used by the attitude control system to control a reflector positioning mechanism that steers the reflector relative to the satellite body to minimize pointing error.

A disadvantage of this arrangement is that each reflector must have a robust reflector positioning mechanism. The positioning mechanism must be robust so it will operate continuously over the typical 10 to 15 year lifetime of the satellite. Consequently, the reflector positioning mechanism is usually heavy and relatively costly to achieve this reliability.

A common goal in the design of satellites is to eliminate the cost and weight and to improve the reliability of all components including the reflector positioning mechanism. To achieve these goals some satellites have antennas mounted to a common thermally stable support structure.

Pointing of the antennas is done in response to a direction sensor connected to the support structure to estimate the pointing direction of the structure. The direction sensor is a separate antenna that, in conjunction with the tracking network, forms tracking beams. These are fed to the tracking receiver to form error signals, which are passed to the attitude control system of the spacecraft.

The attitude control system controls the satellite momentum wheels that in turn steer the entire spacecraft to minimize the pointing error seen by the antennas. One advantage of this system is that the reflectors can be deployed using a relatively simple reflector deployment actuator that must operate only once, at the time of the reflector deployment.

Unfortunately, this system also has several disadvantages. One disadvantage is that the support structure linking all reflectors and feeds must be very stable over temperature, and thus is costly to build. Another disadvantage is that the antennas must be built and integrated at the same time, making the integration process complex and time consuming.

Ultimately the desire is to eliminate the cost and weight of a reflector positioning mechanism while improving system reliability and to allow each antenna to be built independently and integrated at different times.

SUMMARY OF THE INVENTION

It is, therefore, an object of the invention to reduce weight and improve reliability by eliminating a reflector positioning mechanism. Another object of the invention is to reduce weight and improve reliability by eliminating a common thermally stable support structure.

In one aspect of the invention, a satellite antenna pointing system has a reflector antenna for receiving an uplink signal from an earth based ground station and a satellite based phased array assembly for transmitting a downlink signal. Because extraterrestrial communications suffer significant losses during transmission, accurate pointing of both uplink and downlink antennas is desired in order to minimize required signal strength. The present invention uses two different methods for pointing the uplink and downlink antennas.

The reflector antenna is used to receive uplink signals. The reflector antenna of the present invention is pointed to maximize reception of the uplink signal. A reflector pointing error sensor coupled to the reflector antenna to determine proper pointing direction. If the reflector pointing error sensor determines that the reflector antenna is not pointed properly, then a reflector adjusting device physically changes the pointing direction of the reflector antenna until the pointing error is minimized thereby maximizing the uplink signal strength.

The phased array assembly is used for transmitting the downlink signal. Because the phased array assembly is mounted in fixed relation to the reflector antenna, the phased array assembly is pointed after the reflector antenna has been successfully pointed. This is done using an array pointing error sensor attached to the phased array assembly to determine proper pointing direction. If the array pointing error sensor determines that the phased array assembly is not pointed properly, then a phased array controller electronically changes the pointing direction of the phased array assembly until the pointing error is minimized. Because the uplink and downlink antennas are pointed independently a common support structure is not necessary.

The present invention thus achieves a satellite antenna pointing system without the need for a reflector positioning mechanism or a common thermally stable support structure. This allows lower weight and manufacturing costs and has the added advantage of improving system reliability.

Additional advantages and features of the present invention will become apparent from the description that follows, and may be realized by means of the instrumentalities and combinations particularly pointed out in the appended claims, taken in conjunction with the accompanying drawings.

BEST MODES FOR CARRYING OUT THE INVENTION

Figure 1:
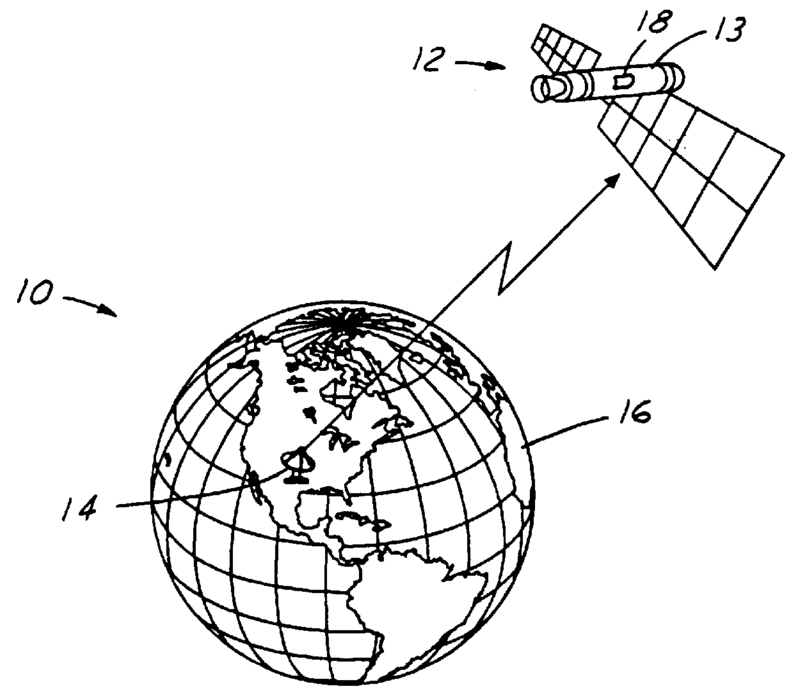
FIG. 1 is a perspective view of a satellite communications system.

Referring to FIG. 1, a satellite communications system 10 according to one embodiment of the present invention is illustrated. The satellite communications system 10 is comprised of one or more satellites 12 in communication with a ground station 14 located on the Earth 16. Each satellite 12 has a satellite body 13 that contains a satellite antenna pointing system 18.

The satellite antenna pointing system 18 is responsible for pointing various uplink and downlink antennas for communication. These communications include, but are not limited to, video, mono and stereo audio, telephone messages, news reports, and other forms of data. Accurate pointing of these antennas is used to maximize the strength of both transmitted and received signals. The more accurately these antennas are pointed, the less power is required for transmission. Because of the size and weight restrictions involved in spacecraft design, accurate antenna pointing, which results in less signal strength required, allows designers to reduce the size and weight of power sources and other components necessary for extraterrestrial communication, thereby conserving valuable resources.

Figure 2:
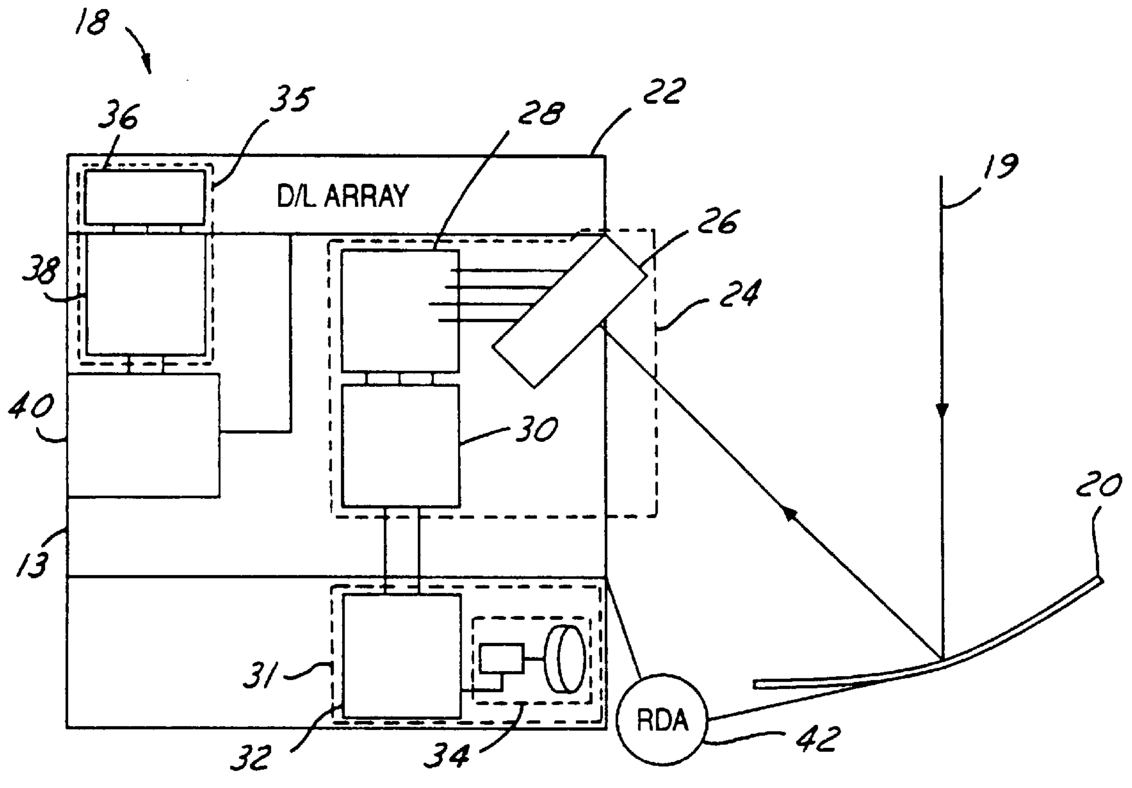
FIG. 2 is block diagram of a satellite antenna pointing system in accordance with the present invention.

Referring now to FIG. 2, a block diagram of a satellite antenna pointing system 18 in accordance with the present invention is illustrated. A reflector antenna 20 is used as a receiving (uplink) antenna, with phased array assembly 22 used as a transmitting (downlink) antenna. These antennas are in communication with a ground station 14.

Reflector antenna 20 is attached to satellite body 13 and is deployed using a reflector deployment actuator (RDA) 42. The reflector deployment actuator 42 replaces a reflector positioning mechanism (not shown) commonly used in the prior art. Reflector deployment actuator 42 is only used once during the useful life of satellite 12, for initial deployment or reflector antenna 20, as compared to using a reflector positioning mechanism that must be robust because it will operate continuously over the typical 10 to 15 year lifetime of satellite 12. Because of this, reflector deployment actuator 42 is relatively lighter and cheaper when compared to a reflector positioning mechanism and results in a more reliable overall system.

Reflector antenna 20 is positioned so that it can focus a terrestrial uplink signal 19 towards uplink feed array 26. In contrast, downlink phased array assembly 22 is rigidly attached to spacecraft body 13. For simplicity, satellite 12 is shown with a single uplink 20 and downlink 22 antenna. Of course, one skilled in the art would recognize that the present invention described herein applies equally to satellites with multiple antennas.

A reflector pointing sensor 24 is positioned in or on satellite body 13 to receive the reflected uplink signal 19 from reflector antenna 20. In the present invention, reflector pointing error sensor 24 has an uplink feed array 26, an uplink tracking network 28 and an uplink tracking receiver 30. Uplink feed array 26 is a collection of feedhorns and is located at the focal point of reflector antenna 20 to receive the uplink beacon signal that has been transmitted from ground station 14 (FIG. 1). Uplink tracking network 28 generates one or more tracking beams pointed nominally in the direction of the arriving beacon signal. Uplink tracking receiver 30 combines and analyzes the tracking beam signals from the tracking network 28 and generates a reflector pointing error signal.

In the present embodiment, a reflector adjusting device 31 comprises a satellite attitude control system 32 and satellite attitude momentum wheels 34. The attitude of satellite 12 is adjusted to point reflector antenna 20 in response to the reflector pointing error signal. Satellite attitude control system 32 controls satellite attitude momentum wheels 34 to steer satellite 12 by exchanging momentum between satellite 12 and satellite momentum wheels 34 which rotates satellite 12. Satellite attitude control system 32 steers satellite 12 until the reflector pointing error signal is minimized.

An array pointing error sensor 35 is attached to phased array assembly 22 to detect downlink pointing error. In the present invention the array pointing error sensor comprises a beacon tracking antenna 36 and a downlink tracking network/receiver combination 38, but one skilled in the art would realize that a star tracker or other attitude estimator could be used.

Figure 3:
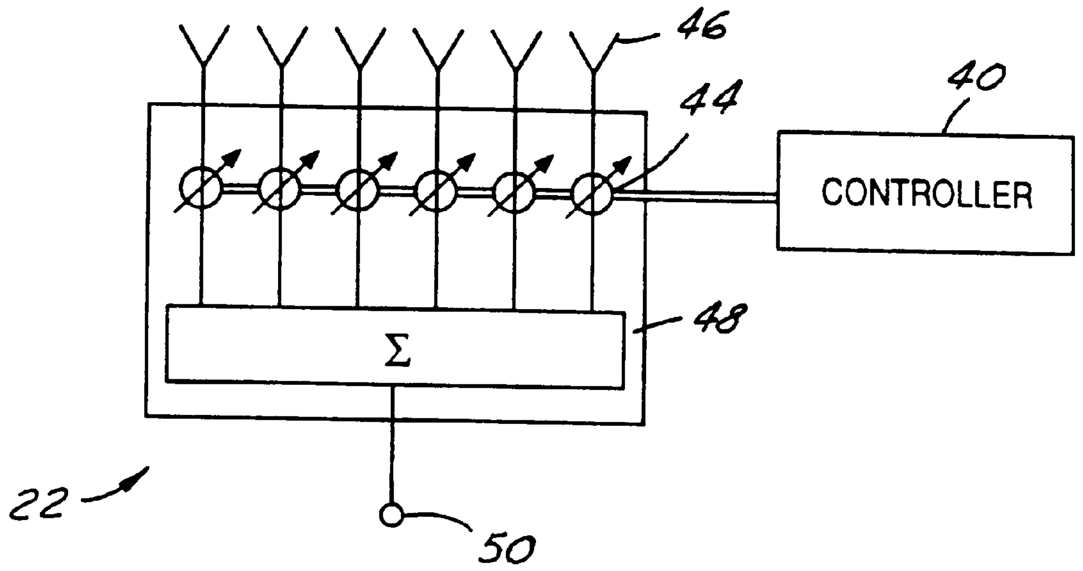
FIG. 3 is a block diagram of a phased array assembly.

Referring now to FIG. 3, a block diagram of a phased array assembly 22 is illustrated. A signal injected into an input port 50 is divided by power divider 48 and distributed to radiating elements 46 via phase shifters 44. Beam direction is controlled electronically by controller 40 that digitally controls individual phase shifters 44 in response to the downlink pointing error generated by the array pointing error sensor 35.

In operation, upon reaching orbit satellite 12 deploys reflector antenna 20 using reflector deployment actuator 42. Once reflector antenna 20 is deployed, uplink tracking network 28 one or more tracking beams pointed nominally in the direction of the arriving beacon signal. Uplink tracking receiver 30 combines and analyzes the tracking beam signals from the tracking network 28 and generates a reflector pointing error signal. In response to this pointing error estimate, attitude control system 31 steers satellite 12 to point reflector antenna 20 towards ground station 14. Upon achieving this position, an estimate of uplink pointing error is generated by reflector pointing error sensor 24 and satellite 12 is repositioned by attitude control system 31 to point reflector antenna 20 in the correct direction.

After the correct pointing direction is achieved by reflector antenna 20, an estimate of downlink pointing error is determined by an array pointing error sensor 35. In response to this downlink pointing error a phased array controller 40 digitally controls individual phase shifters 44 to electronically redirect the downlink beams, compensating for the estimated downlink pointing offset.

It is to be understood that the preceding description of the preferred embodiment is merely illustrative of some of the many specific embodiments that represent applications of the principles of the present invention.

Clearly, numerous and other arrangements would be evident to those skilled in the art without departing from the scope of the invention as defined by the following claims:

1. A satellite antenna pointing system, comprising:

a satellite body;

a reflector antenna mounted in fixed relation to said satellite body;

a reflector pointing error sensor coupled to said reflector antenna, generating a pointing error signal;

a reflector adjusting device coupled to said reflector pointing error sensor, said reflector adjusting device positioning said satellite body in response to said reflector pointing error signal;

a phased array assembly mounted in fixed relation to said reflector antenna;

an array pointing error sensor attached to said phased array assembly, said array pointing error sensor generating an array pointing error signal; and a phased array controller coupled to said array pointing error sensor, said phased array controller pointing said phased array assembly in response to said array pointing error signal.

2. A satellite antenna pointing system as recited in claim 1 wherein said reflector antenna is an uplink antenna.

3. A satellite antenna pointing system as recited in claim 1 wherein said reflector pointing error sensor comprises:

an uplink feed array coupled to said reflector antenna;

an uplink tracking network coupled to said uplink feed array; and an uplink tracking receiver coupled to said uplink tracking network.

4. A satellite antenna pointing system as recited in claim 1 wherein said reflector adjusting device comprises a satellite attitude control system coupled to satellite momentum wheels.

5. A satellite antenna pointing system as recited in claim 1 wherein said phased array assembly comprises a downlink antenna.

6. A satellite antenna pointing system as recited in claim 1 wherein said phased array assembly comprises a plurality of phased array radiating elements and a plurality of phase shifters coupled to said phased array controller.

7. A satellite antenna pointing system as recited in claim 1 wherein said array pointing error sensor comprises:

a beacon tracking antenna; and a downlink tracking network/receiver combination coupled to said beacon tracking antenna.

8. A satellite antenna pointing system as recited in claim 1 wherein said array pointing error sensor comprises a star tracker.

9. A satellite communications system, comprising:

a ground station;

a satellite in orbit and in communication with said ground station, said satellite having a satellite body;

a satellite antenna pointing system, comprising:

a reflector antenna mounted in fixed relation to said satellite body;

a reflector pointing error sensor coupled to said reflector antenna, generating a pointing error signal;

a reflector adjusting device coupled to said reflector pointing error sensor, said reflector adjusting device positioning said satellite body in response to said reflector pointing error signal;

a phased array assembly mounted in fixed relation to said satellite body;

an array pointing error sensor attached to said phased array assembly, said array pointing error sensor generating an array pointing error signal; and a phased array controller coupled to said array pointing error sensor, said phased array controller pointing said phased array assembly in response to said array pointing error signal.

10. A satellite communications system as recited in claim 9 wherein said reflector antenna is an uplink antenna.

11. A satellite communications system as recited in claim 9 wherein said reflector pointing error sensor comprises:

an uplink feed array coupled to said reflector antenna;

an uplink tracking network coupled to said uplink feed array; and an uplink tracking receiver coupled to said uplink tracking network.

12. A satellite communications system as recited in claim 9 wherein said reflector adjusting device comprises a satellite attitude control system coupled to satellite momentum wheels.

13. A satellite communications system as recited in claim 9 wherein said phased array assembly is a downlink antenna.

14. A satellite communications system as recited in claim 9 wherein said phased array assembly comprises a plurality of phased array radiating elements and a plurality of phase shifters coupled to said phased array controller.

15. A satellite antenna pointing system as recited in claim 9 wherein said array pointing error sensor comprises:

a beacon tracking antenna;

a downlink tracking network/receiver combination coupled to said beacon tracking antenna.

16. A satellite communications system as recited in claim 9 wherein said array pointing error sensor comprises a star tracker.

17. A satellite communications system as recited in claim 9 wherein said reflector antenna is deployed by a reflector deployment actuator.

18. A method of pointing a satellite antenna, comprising the steps of:

generating a desired uplink pointing direction;

positioning a satellite body to receive an uplink beam;

generating an estimate of uplink pointing error;

comparing said estimate of uplink pointing error to said desired uplink pointing direction to obtain an offset uplink pointing direction;

repositioning said satellite body in response to said offset uplink pointing direction;

generating a desired downlink pointing direction;

generating a downlink beam;

generating an estimate of downlink pointing error;

comparing said estimate of downlink pointing error to said desired downlink pointing direction to obtain an offset downlink pointing direction;

generating phase commands in response to said offset downlink pointing direction; and redirecting said downlink beam electronically in response to said phase commands.

19. A method of pointing a satellite antenna as recited in claim 18 wherein the step of comparing comprises subtracting said estimate of pointing error from said desired pointing direction to obtain an offset pointing direction.

* * * * *